United States Patent
Pladdy et al.

(10) Patent No.: US 7,289,580 B2
(45) Date of Patent: Oct. 30, 2007

(54) CHANNEL ESTIMATOR USING ONE OR MORE CORRELATION REFERENCE VECTORS TO ELIMINATE DATA RELATED NOISE

(75) Inventors: Christopher J. Pladdy, Chicago, IL (US); Mark Fimoff, Hoffman Estates, IL (US); Sreenivasa M. Nerayanuru, Wheeling, IL (US); Serdar Ozen, West Lafayette, IN (US); Michael D. Zoltowski, West Lafayette, IN (US)

(73) Assignee: Zenith Electronics Corporation, Lincolnshire, IL (US)

(*) Notice: Subject to any disclaimer, the term of this patent is extended or adjusted under 35 U.S.C. 154(b) by 954 days.

(21) Appl. No.: 10/267,242

(22) Filed: Oct. 9, 2002

(65) Prior Publication Data

US 2003/0223514 A1 Dec. 4, 2003

Related U.S. Application Data

(60) Provisional application No. 60/384,758, filed on May 31, 2002.

(51) Int. Cl.
*H04L 27/06* (2006.01)
(52) U.S. Cl. .................................... 375/343
(58) Field of Classification Search ................ 375/148, 375/144, 232, 142, 145, 150, 340, 342, 343
See application file for complete search history.

(56) References Cited

U.S. PATENT DOCUMENTS 5,574,747 A * 11/1996 Lomp .......................... 375/144
5,970,092 A * 10/1999 Currivan ....................... 375/232
6,801,565 B1 * 10/2004 Bottomley et al. .......... 375/148
7,107,304 B2 * 9/2006 Sazegari et al. ............. 708/420
2002/0176485 A1 * 11/2002 Hudson ....................... 375/144

OTHER PUBLICATIONS

Liu et al.; A Decorrelating RAKE Receiver for CDMA Communications over frequency-selective fading channels; IEEE Transcations on Comunications; vol. 47, No. 7; Jul. 1999; pp. 1036-1045.*
Wang et al. (Parallel-decomposition algorithm for discrete computational problems and its application in developing an efficient discrete convolution algorithm; IEE Proceedings of Vision, Image and Signal Processing; Feb. 1995; vol. 142, No. 1; pp. 40-46).*
C. A. Montemayor et al. "Near-Optimum Iterative Estimation of Dispersive Multipath Channels", 1998 IEEE, VTC '98, pp. 2246-2250.

* cited by examiner

Primary Examiner—Don N. Vo (57) ABSTRACT

An impulse response of a channel is estimated by correlating a received signal with a stored vector. The received signal contains a training sequence having a length $L_{tr}$, the stored vector has a length $L_{sv}$, $L_{tr}/n=L_{sv}$, and n is greater than two. The signal is received by a device. The vector is determined based on the training sequence and an ideal channel. The ideal channel is an idealized form of a channel through which the device receives the signal. A plurality of correlations may be performed where each correlation provides a substantially noise-free estimate of the impulse response of a different portion of the channel. The correlations are combined to provide an estimate of the impulse response of the channel.

34 Claims, 3 Drawing Sheets

CHANNEL ESTIMATOR USING ONE OR MORE CORRELATION REFERENCE VECTORS TO ELIMINATE DATA RELATED NOISE

RELATED APPLICATIONS

The present application claims the benefit of Provisional Application Ser. No. 60/384,758 filed on May 31, 2002.

TECHNICAL FIELD OF THE INVENTION

The present invention relates to generating a channel impulse response that characterizes a transmission channel. The channel impulse response may then be used, for example, to initialize the tap weights for the taps of an equalizer.

BACKGROUND OF THE INVENTION

Linear adaptive equalizers having a plurality of taps are widely used in digital communication receivers in order to provide correction for multipath channel distortion. Adaptive algorithms, such as the least mean squares (LMS) algorithm, are typically implemented in order to determine the weight values for the taps of the equalizer. Such adaptive algorithms are easy to implement and provide reasonably good performance. However, under difficult channel conditions, these algorithms may fail to provide tap weights that converge to the desired values.

It is well known that this failure may be at least somewhat mitigated if the tap weights, instead of being initialized to values of zero as is often done, are instead initialized close to their final desired values based on a knowledge of the impulse response of the channel. An estimate of this channel impulse response (CIR) may be derived from an a priori known training sequence periodically transmitted prior to, and/or along with, the unknown data. One such system with this feature is specified in the ATSC 8VSB standard for digital terrestrial television broadcasting.

The channel impulse response is typically estimated in a receiver by cross-correlating the a priori known training sequence as received with a representation of the transmitted known training sequence stored in the receiver as a correlation reference. The Z-transform of the estimated channel impulse response is then derived and inverted. From the inverted Z-transform, a vector is formed having a plurality of elements, and these elements are used to initialize the corresponding tap weights of the equalizer.

More specifically, if s[k] is defined as the stored known training sequence for k=0 ... (L−1), and if x[k] is defined as the received signal sampled at the symbol rate, with x[0] being the first received training symbol in the received signal, the cross-correlation h[m] is given by the following equation:

$$h[m] = \sum_{k=0}^{L-1} s[k]x[k+m], \text{ for } -L_{chan} \le m \le L_{chan} \quad (1)$$

where $L_{chan}$ is the length of the channel over which the correlation is taken. $L_{chan}$, for example, is typically set at 576. The Z-transform of h[m] is determined and is inverted in order to determine the tap weights for the taps of the equalizer.

This procedure addresses channel related noise. However, there are other sources of noise. For example, noise due to the finiteness of the cross-correlation as described in copending U.S. Pat. No. 7,110,447 and in copending U.S. Pat. No. 7,190,447 is present in the channel impulse response and can cause errors in the determination of the tap weights. As described in these applications, this noise due to the finiteness of the cross-correlation may be removed by cross-correlating a known stored training sequence with the received training sequence to produce a cross-correlation vector, by estimating a correction vector related to the finiteness noise component, and by iteratively subtracting truncated representations of the correction vector from the cross-correlation vector so as to produce a succession of cross-correlation outputs of increasing accuracy.

The channel impulse response can also contain data related noise. Data related noise arises in the channel impulse response because the stored version of the known training sequence is not only correlated with the received training sequence, but is also correlated with data received before and/or after the received training sequence.

Figure 1:
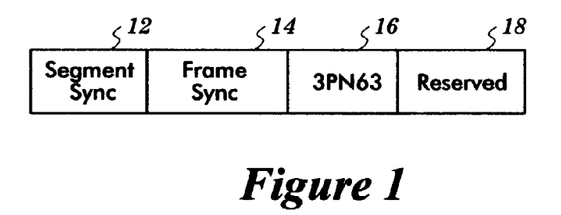
FIG. 1 illustrates a frame sync segment according to the ATSC digital television standard.

The training sequence, for example, may be based on the frame sync segment of a digital television signal as specified in the ATSC digital television standard. As shown in FIG. 1, such a frame sync segment 10 comprises a first portion 12 containing four segment sync symbols, a second portion 14 containing 511 frame sync symbols, a third portion 16 containing a 63 pseudorandom symbol sequence replicated three times for a total of 189 symbols where the middle sequence is inverted in alternate fields, and a fourth portion 18 of reserved space for 24 symbols. The known training sequence (or reference), according to the example, may comprise the first 704 symbols in the frame sync segment 10. Thus, this training sequence comprises the four segment sync symbols of the first portion 12, the 511 frame sync symbols of the second portion 14 of the frame sync segment 10, and the 189 symbols in the three 63 pseudorandom symbol sequences for a total of 704 symbols.

Figure 2:
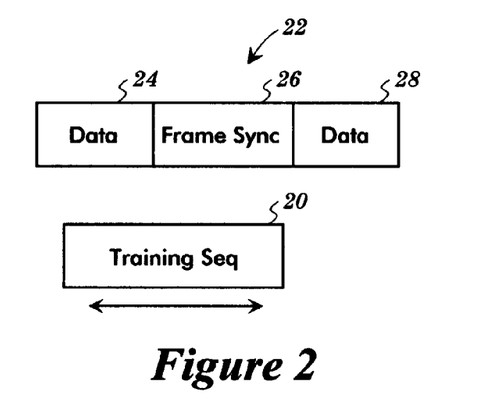
FIG. 2 illustrates a cross-correlation of a stored training sequence and a received signal.

As shown in FIG. 2, a cross-correlation based on this training sequence is implemented by shifting a training sequence 20, such as the 704 symbol training sequence described immediately above, over a received signal 22 that includes first data 24, the frame sync segment 26, and second data 28. As can be seen from FIG. 2 and as will be understood from equation (1) above, the resulting correlation h[m] contains some terms that involve only the training sequence and many terms that involve unknown data.

Figure 3:
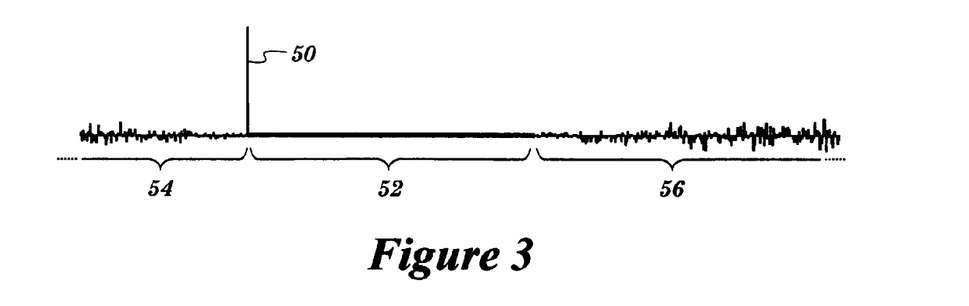
FIG. 3 illustrates the channel impulse response resulting from the correlation of FIG. 2 where noise related to the finiteness of the correlation has been removed.

A representation of the correlation h[m] is shown in FIG. 3, where the noise related to the finiteness of the correlation has been removed. A peak 50 represents the single path received signal in the channel impulse response. As can be seen from FIG. 3, in the case where the stored reference sequence is shorter than the received training sequence, a portion 52 is the portion of the correlation involving only the training sequence, and portions 54 and 56 are portions of the correlation involving unknown data symbols. The portion 52 contains little or no noise and the portions 54 and 56 contain data related noise.

When a transmitted signal is received over multiple paths, this data related noise may be enhanced to the point where one or more of the multipath components (sometimes referred to as ghosts) are undetectable in the correlation. If so, the tap weights computed from such a channel impulse response will be unreliable.

The present invention is directed to the removal of this data related noise from the channel impulse response.

SUMMARY OF THE INVENTION

According to one aspect of the present invention, a method of estimating the channel impulse response of a channel comprises the following: performing a plurality of correlations, wherein each of the correlations provides a substantially noise-free estimate of the impulse response of a different portion of the channel; and, combining the plurality of substantially noise-free estimates to provide an estimate of the channel impulse response.

According to another aspect of the present invention, a method of estimating the impulse response of a channel comprises the following: receiving a signal; and, correlating the received signal with a stored vector derived as the least squares solution of the equation Sc=γ. The received signal comprises a training sequence having a length $L_{tr}$, S is a matrix formed by the transmitted training sequence, c is the stored vector having a length $L_{sv}$, $L_{tr}/n=L_{sv}$, n is greater than two, and γ represents at least a portion of an ideal channel.

According to still another aspect of the present invention, a method comprises the following: selecting a training sequence, wherein the training sequence is contained in a signal received by a device; selecting an ideal channel, wherein the ideal channel comprises an idealized form of a channel through which the device receives the signal; determining a vector from the training sequence and the ideal channel; and, storing the vector in the device.

BRIEF DESCRIPTION OF THE DRAWINGS

These and other features and advantages will become more apparent from a detailed consideration of the invention when taken in conjunction with the drawings in which.

DETAILED DESCRIPTION

Data related noise may be eliminated by using a correlation reference (or vector) c that is stored in the receiver and that is substantially shorter than the transmitted training sequence. Accordingly, the portion of the correlation having data related noise is much smaller than is otherwise the case.

For example, in the context of digital television where the training sequence comprises the 704 symbols as described above, the correlation reference c, that is stored in the receiver and that is correlated with the received signal, may comprise 128 symbols. Therefore, in a digital television application, there will be 704−128=576 correlation values having no data related noise.

Where the transmitted training sequence comprises 704 symbols and the correlation reference c comprises 128 symbols, the correlation reference c may be determined in accordance with the solution of the following equation:

$$Sc = \gamma \quad (2)$$

where S is a matrix formed by the transmitted training sequence, c is the correlation reference to be determined and is also in the form of a matrix, and γ represents an ideal channel (i.e., a channel without multipath distortion) and is a matrix product of the training sequence S and the correlation reference c.

In the context of digital television, the matrix S may be a 128×577 matrix given by the following equation:

$$S = \begin{bmatrix} u[0] & u[1] & u[2] & \cdots & u[127] \\ u[1] & u[2] & u[3] & \cdots & u[128] \\ \cdots & \cdots & \cdots & \cdots & \cdots \\ u[127] & u[128] & u[129] & \cdots & u[254] \\ u[128] & u[129] & u[130] & \cdots & u[255] \\ u[129] & u[130] & u[131] & \cdots & u[256] \\ \cdots & \cdots & \cdots & \cdots & \cdots \\ u[575] & u[576] & u[577] & \cdots & u[702] \\ u[576] & u[577] & u[578] & \cdots & u[703] \end{bmatrix} \quad (3)$$

where u[0] ... u[703] correspond to the 704 symbols of the training sequence. The correlation reference c may be a 1×128 matrix given by the following equation:

$$c = \begin{bmatrix} c[0] \\ c[1] \\ c[2] \\ \vdots \\ c[127] \end{bmatrix} \quad (4)$$

The ideal matrix product γ may be a 1×577 matrix given by the following equation:

$$\gamma = \begin{bmatrix} 0 \\ \vdots \\ 0 \\ 1 \\ 0 \\ \vdots \\ 0 \end{bmatrix} \quad (5)$$

having all zero terms except for a 1 in position 129 from the top. More generally, the 1 appears in the cursor position of the decision feedback equalizer.

In digital television, the training sequence is known and does not change from transmission to transmission. Therefore, the correlation reference c can be calculated once, such as in the factory, and stored in the receiver. The receiver from then on uses the stored reference c in order to calculate a channel impulse response without data related noise and to determine the initial tap weights for its equalizer from this channel impulse response. For example, the correlation reference may be used periodically or a-periodically, such as at each channel change, to initialize the tap weights for the equalizer.

The correlation reference c using this procedure is a vector given as follows: 0.1539, 0.1095, −0.1371, 0.1660, −0.1364, 0.2183, 0.1813, 0.1006, 0.1723, 0.2191, −0.1543, 0.1553, −0.1465, −0.1269, 0.1784, 0.1501, −0.0964, 0.1850, −0.1311, 0.1568, −0.1501, −0.1883, 0.1704, 0.1464, 0.1631, −0.0808, 0.2083, 0.1947, −0.1619, −0.1218, 0.1112, 0.1486, 0.1707, −0.1620, 0.0948, −0.1228, −0.0833, 0.1550, −0.2117, −0.2114, −0.1662, 0.0932, −0.1598, 0.1293, 0.1373, −0.2074, −0.1973, −0.1280, 0.1923, 0.1877, 0.1884, 0.2000, −0.1738, −0.1690, 0.1214, −0.1529, −0.2302, −0.2134, −0.0982, 0.1544, −0.1358, 0.1086, −0.1221, −0.1447, −0.1904, 0.1603, 0.1447, 0.1108, 0.1719, 0.1952, −0.1821, −0.1554, 0.1670, 0.2317, 0.1783, 0.1850, −0.1870, 0.0847, −0.2191, 0.1058, −0.1259, −0.1399, −0.1058, 0.1588, −0.2831, 0.1360, −0.1115, −0.1727, 0.0671, 0.2083, −0.1152, −0.1402, −0.2499, −0.1049, 0.1475, 0.0868, −0.1834, −0.1115, −0.2203, 0.0890, −0.1542, −0.2390, −0.2424, −0.1227, −0.0774, 0.1348, −0.1360, −0.1231, −0.2189, −0.2293, 0.0219, 0.2167, 0.1889, 0.1962, 0.2018, 0.0850, −0.2263, −0.1300, −0.1431, −0.2298, −0.1405, 0.1537, −0.1154, 0.1150, −0.0705, 0.1519, −0.1868, 0.2179. The values in this vector should be multiplied by 0.0001 prior to use.

It should be understood, however, that these values may be varied without departing from the scope of the invention.

Figure 4:
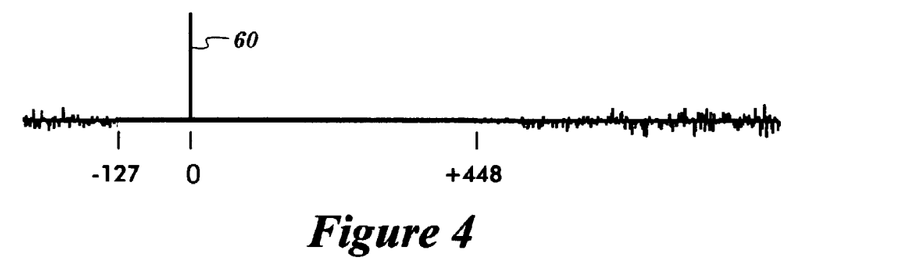
FIG. 4 illustrates an exemplary correlation between a stored reference c and a training sequence in a digital television application.

FIG. 4 shows an exemplary correlation when this correlation reference c is used in a digital television application (i.e., the correlation reference c is correlated with the received 704 symbols of the training sequence for an equalizer having a cursor at index 128). A maximum correlation peak 60 is present at correlation index 0 and the portion of the correlation containing no data related noise extends from correlation index −127 to correlation index +448 in this example.

Figure 5:
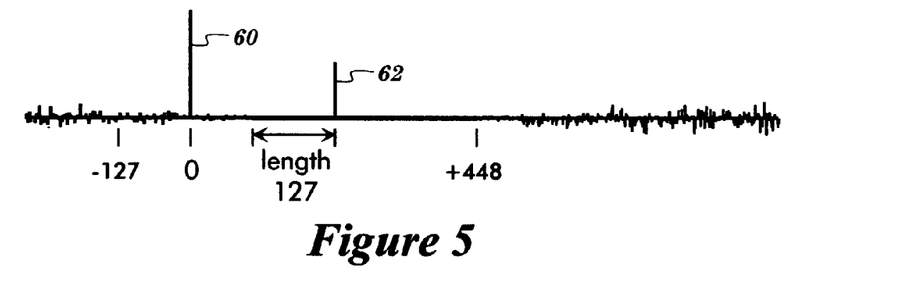
FIG. 5 illustrates the effect of ghost on the correlation of FIG. 4.

While FIG. 4 is representative of a single path channel, a multipath channel introduces peaks that cause data related noise to appear in the channel (i.e., in the area between −127 and +448). For example, FIG. 5 shows how a ghost introduces data related noise in the channel.

In this case, multiple sets of correlation references may be stored in the receiver and may be correlated with the received signal. For example, eight correlation references c, d, e, f, g, h, j, and k may be stored in the receiver to be correlated with the received signal containing the transmitted training sequence. These eight correlation references may be determined in a manner similar to the procedure disclosed above.

Specifically, the correlation references c, d, e, f, g, h, j, and k may be determined as the solution of the following equations:

$$Sc = \gamma_c \quad (6)$$

$$Sd = \gamma_d \quad (7)$$

$$Se = \gamma_e \quad (8)$$

$$Sf = \gamma_f \quad (9)$$

$$Sg = \gamma_g \quad (10)$$

$$Sh = \gamma_h \quad (11)$$

$$Sj = \gamma_j \quad (12)$$

$$Sk = \gamma_k \quad (13)$$

where S in equations (6)-(13) is a matrix given by equation (3) above, where the correlation references c, d, e, f, g, h, j, and k are to be determined, and where $\gamma_c$, $\gamma_d$, $\gamma_e$, $\gamma_f$, $\gamma_g$, $\gamma_h$, $\gamma_j$, and $\gamma_k$ are different ideal channel matrix products used in equations (6)-(13) and are defined in:

$$\gamma_c = \begin{bmatrix} 0_{64} \\ 1 \\ 0_{512} \end{bmatrix} \quad (14)$$

$$\gamma_d = \begin{bmatrix} 0_{128} \\ 1 \\ 0_{448} \end{bmatrix} \quad (15)$$

$$\gamma_e = \begin{bmatrix} 0_{192} \\ 1 \\ 0_{384} \end{bmatrix} \quad (16)$$

$$\gamma_f = \begin{bmatrix} 0_{256} \\ 1 \\ 0_{320} \end{bmatrix} \quad (17)$$

$$\gamma_g = \begin{bmatrix} 0_{320} \\ 1 \\ 0_{256} \end{bmatrix} \quad (18)$$

$$\gamma_h = \begin{bmatrix} 0_{384} \\ 1 \\ 0_{192} \end{bmatrix} \quad (19)$$

$$\gamma_j = \begin{bmatrix} 0_{448} \\ 1 \\ 0_{128} \end{bmatrix} \quad (20)$$

$$\gamma_k = \begin{bmatrix} 0_{512} \\ 1 \\ 0_{64} \end{bmatrix} \quad (21)$$

wherein $0_N$ indicates N zeroes. For example, the single column in the $\gamma_k$ matrix has 512 zeroes above the 1 and 64 zeroes below the 1. Correlation references c-k, which comprise the least squares solution of equations (6)-(13) using the ideal channel matrices $\gamma_c$, $\gamma_d$, $\gamma_e$, $\gamma_f$, $\gamma_g$, $\gamma_h$, $\gamma_j$, and $\gamma_k$ (see equations (14)-(21)) are set forth herein as follows.

Correlation reference c is a vector given as follows: 0.1539, 0.1095, −0.1371, 0.1660, −0.1364, 0.2183, 0.1813, 0.1006, 0.1723, 0.2191, −0.1543, 0.1553, −0.1465, −0.1269, 0.1784, 0.1501, −0.0964, 0.1850, −0.1311, 0.1568, −0.1501, −0.1883, 0.1704, 0.1464, 0.1631, −0.0808, 0.2083, 0.1947, −0.1619, −0.1218, 0.1112, 0.1486, 0.1707, −0.1620, 0.0948 −0.1228, −0.0833, 0.1550, −0.2117, −0.2114, −0.1662, 0.0932, −0.1598, 0.1293, 0.1373, −0.2074, −0.1973, −0.1280, 0.1923, 0.1877, 0.1884, 0.2000, −0.1738, −0.1690, 0.1214, −0.1529 −0.2302, −0.2134, −0.0982, 0.1544, −0.1358, 0.1086, −0.1221 −0.1447, −0.1904, 0.1603, 0.1447, 0.1108, 0.1719, 0.1952, −0.1821, −0.1554, 0.1670, 0.2317, 0.1783, 0.1850, −0.1870, 0.0847, −0.2191, 0.1058, −0.1259, −0.1399, −0.1058, 0.1588, −0.2831, 0.1360, −0.1115, −0.1727, 0.0671, 0.2083, −0.1152 −0.1402, −0.2499, −0.1049, 0.1475, 0.0868, −0.1834, −0.1115 −0.2203, 0.0890, −0.1542, −0.2390, −0.2424, −0.1227, −0.0774, 0.1348, −0.1360, −0.1231, −0.2189, −0.2293, 0.0219, 0.2167, 0.1889, 0.1962, 0.2018, 0.0850, −0.2263, −0.1300, −0.1431, −0.2298, −0.1405, 0.1537, −0.1154, 0.1150, −0.0705, 0.1519, −0.1868, −0.2179. The values in this vector should be multiplied by 0.0001 prior to use.

Correlation reference d is a vector given as follows: −0.1534, 0.0908, 0.1003, 0.1418, 0.0508, 0.1500, −0.1703, −0.2216, 0.1399, 0.1740, 0.1543, 0.1601, −0.1210, 0.2008,
−0.2052, 0.1455, −0.1423, −0.1225, −0.1018, 0.1197,
−0.1774, 0.1636, −0.1309, −0.1496, 0.0963, 0.1405,
−0.1506, −0.1943, −0.1308, −0.2074, 0.1532, 0.1877,
−0.2032, −0.2123, −0.1570, 0.1979, −0.1797, −0.1670,
−0.2469, −0.0999, −0.1245, 0.1261, −0.1681, −0.0659,
−0.1255, −0.1881, 0.1228, 0.1799, 0.1545, 0.1952, 0.1310,
0.1777, −0.1280, −0.1806, −0.1214, −0.1552, −0.1968,
0.1918, −0.2043, 0.1838, −0.1586, 0.1348, −0.1112,
−0.2213, −0.2279, −0.0851, −0.1539, −0.0944, 0.1336,
0.1347, −0.1469, −0.1383, 0.1909, 0.1479, 0.1732, 0.1213,
0.1465, 0.0720, 0.1134, −0.1829, 0.1770, 0.0758, 0.1566,
−0.1202, 0.1128, −0.2093, 0.1247, −0.1535, 0.2248,
−0.1767, −0.1403, 0.1325, −0.1965, 0.1647, 0.1366,
−0.2199, −0.1401, 0.1604, 0.2521, −0.1748, −0.1504,
−0.1582, 0.0706, 0.1584, −0.2150, 0.1401, 0.1289, 0.1552,
−0.1911, 0.1454, 0.2237, 0.2526, 0.1809, −0.1218, 0.1826,
0.1423, −0.1909, 0.1533, −0.1951, −0.1699, 0.2607,
−0.1429, 0.1701, −0.1930, −0.1113, 0.1973, −0.1950,
−0.1886. The values in this vector should be multiplied by 0.0001 prior to use.

Correlation reference e is a vector given as follows:
−0.1638, −0.0964, −0.1290, −0.1074, 0.1361, 0.1641,
−0.1341, −0.1138, 0.1985, 0.1442, 0.1615, 0.1349, 0.1139,
0.1737, 0.1504, −0.1190, 0.1497, 0.1515, 0.1489, −0.1281,
0.1215 −0.2115, 0.1111, −0.1325, 0.1681, −0.1957, −0.1276,
0.1394, −0.1908, 0.1943, 0.1633, −0.1293, −0.1034, 0.1582,
0.1306, −0.1754, −0.1117, −0.1753, 0.0948, 0.1580,
−0.1238, 0.1128, 0.1579, 0.1289, −0.1418, 0.1618, 0.1576,
0.2157, 0.2087, −0.0900, 0.1778, 0.1288, −0.1799, 0.1792,
−0.1164, −0.1639, 0.2192, −0.0415, 0.1422, −0.1914,
−0.1492, 0.1914, −0.1163, −0.1531, 0.1462, 0.1307, 0.1137,
−0.1035, −0.1887, 0.1188, 0.2090, 0.1899, −0.0832,
−0.1428, −0.1466, 0.2132, −0.1943, 0.1292, 0.1178, 0.2547,
−0.0820, 0.1206, −0.2626, −0.1825, −0.1134, −0.0961,
0.1028, 0.1932, −0.1193, 0.1403, −0.1554, −0.2621, 0.1159,
0.2466, 0.1259, 0.1362, 0.1619, −0.1552, 0.1449, 0.0985,
−0.2013, −0.0704, −0.0547, 0.2179, −0.1374, 0.1749,
−0.1267, 0.1505, 0.1938, −0.1797, 0.2231, 0.1995, 0.0990,
0.1846, −0.1830, −0.2300, 0.2309, 0.1600, −0.1622, 0.1583,
0.1421, −0.1633, 0.0554, −0.2784, 0.2206, 0.0975, 0.1304,
−0.0236. The values in this vector should be multiplied by 0.0001 prior to use.

Correlation reference f is a vector given as follows:
0.1247, 0.1589, 0.1685, −0.1266, −0.1739, 0.1673, 0.1260,
0.0763, −0.0818, −0.1941, −0.1572, 0.2106, −0.1445,
0.2013, 0.1811, 0.1291, −0.1359, 0.1802, −0.1573, −0.2218,
−0.0951, −0.0808, 0.1435, 0.1272, −0.0961, 0.1603,
−0.1566, −0.1669, 0.0982, 0.2181, 0.1984, 0.1891, 0.1268,
−0.1951, 0.1639, 0.1914, −0.1067, −0.1691, −0.1533,
0.1866, −0.1277, 0.1025, −0.0988, 0.2389, 0.2312, −0.1400,
0.1072, 0.2140, 0.1611, 0.1304, −0.2321, −0.1435, 0.2316,
0.1871, −0.0757, 0.1632, 0.1517, −0.0665, 0.1484, −0.2468,
0.1223, 0.1735, 0.2150, −0.1735, 0.0892, 0.1764, −0.1532,
0.2056, 0.1802, −0.1099, −0.0892, 0.0956, −0.2032, 0.1454,
0.1267, −0.1073, 0.1732, 0.1279, −0.1531, 0.1662, 0.1565,
0.1240, −0.1693, −0.2116, 0.1872, −0.0471, −0.1348,
0.0904, −0.0953, −0.2207, 0.1151, −0.1025, 0.1257, 0.2558,
0.1857, −0.1746, −0.1559, −0.1391, 0.2050, 0.1715, 0.1883,
−0.1528, −0.1345, 0.1180, −0.2422, 0.0988, 0.2352, 0.2067,
0.1294, −0.1347, 0.1602, −0.0500, −0.1510, −0.2004,
0.1311, 0.1419, −0.1009, 0.1652, −0.1212, 0.2025, 0.1248,
−0.2113, −0.1460, −0.1615, −0.0420, 0.1969, −0.2641,
−0.1790. The values in this vector should be multiplied by 0.0001 prior to use.

Correlation reference g is a vector given as follows:
0.1180, 0.1932, −0.1383, 0.1221, 0.2357, −0.0922, −0.1138,
0.1878, −0.1309, 0.1728, 0.1421, −0.1618, 0.1351, 0.0608,
−0.1209, 0.1609, 0.1116, 0.1824, −0.1595, −0.0952, 0.1708,
−0.1475, −0.1368, 0.1499, −0.1601, −0.1717, 0.1883,
−0.1321, 0.1232, 0.1894, 0.1925, −0.1756, −0.0950,
−0.1490, 0.1034, 0.1141, 0.1073, −0.1412, −0.2028, 0.1264,
−0.2242, 0.1451, 0.1844, 0.1247, 0.1253, −0.1748, 0.0746,
−0.1964, −0.1172, −0.1392, 0.1954, 0.1803, −0.1748,
0.1727, −0.0919, 0.1709, 0.1324, −0.1555, −0.1197,
−0.2083, −0.1187, 0.1885, −0.1370, −0.0757, 0.1549,
0.1597, −0.1179, 0.1735, 0.1160, 0.1263, 0.1478, 0.1252,
−0.1604, −0.1335, −0.1549, 0.2700, −0.0738 −0.2648,
0.1606, −0.1104, 0.1371, −0.1389, 0.1615, 0.1524, 0.0941,
0.1519, −0.1511, −0.2097, −0.1586, 0.1799, 0.1240,
−0.1322, −0.1395, 0.1526, −0.1637, 0.0665, −0.1905,
−0.1055, −0.1678, −0.1379, 0.0863, −0.1924, −0.1282,
−0.1479, 0.2191, 0.1455, −0.0469, −0.0905, −0.2546,
−0.1175, −0.1795, 0.0762, 0.1283, 0.1688, 0.1951, −0.2189,
0.1610, 0.1220, 0.1381, 0.2243, 0.1798, 0.1328, −0.1523,
0.0972, −0.0934, 0.1708, 0.967, 0.1020. The values in this vector should be multiplied by 0.0001 prior to use.

Correlation reference h is a vector given as follows:
0.2050, 0.1479, −0.1490, 0.1537, 0.0941, 0.0935, 0.1228,
0.1367, −0.2005, −0.0906, −0.1255, 0.1631, −0.0433,
−0.1098, 0.1227, −0.1673, 0.1976, −0.1607, 0.1154, 0.1543,
0.2299, 0.1871, −0.0944, −0.1580, −0.1377, 0.2005, 0.1306,
−0.1786, −0.2020, 0.1380, −0.1420, 0.1746, −0.2172,
−0.0718, −0.1071, −0.1348, 0.1179, −0.1356, −0.1260,
−0.1961, 0.1404, 0.0543, −0.1013, −0.0873, −0.1367,
−0.1274, −0.0939, 0.1588, 0.1355, 0.1139, 0.1101, −0.2122,
0.1204, 0.2133, 0.0758, 0.1671, 0.2256, 0.1759, −0.1646,
0.1071, −0.1889, 0.0911, 0.0969, −0.2067, 0.1602, −0.1832,
0.2167, −0.1034, 0.1961, 0.1419, −0.0799, −0.1856, 0.0427,
−0.2014, −0.1658, 0.1091, 0.1438, −0.1346, −0.1840,
0.1699, −0.1857, −0.1569, −0.1601, 0.1184, 0.0995, 0.1145,
−0.1929, 0.1440, 0.1740, 0.1530, −0.1427, −0.1521,
−0.1450, −0.1570, 0.1616, −0.1668, 0.0854, 0.1763,
−0.1976, 0.1595, −0.1828, −0.1610, −0.1855, −0.1705,
−0.1532, 0.1313, 0.1375, −0.1334, 0.1576, 0.0819, −0.1078,
−0.0996, −0.1633, −0.1199, −0.1523, −0.0986, 0.2245,
−0.1534, −0.1291, 0.1980, −0.1277, −0.2300, −0.1752,
−0.1504, −0.1704, −0.0479, −0.1788, 0.1300. The values in this vector should be multiplied by 0.0001 prior to use.

Correlation reference j is a vector given as follows:
0.2050, 0.1479, −0.1490, 0.1537, 0.0941, 0.0935, 0.1228,
0.1367, −0.2005, −0.0906, −0.1255, 0.1631, −0.0433,
−0.1098, 0.1227, −0.1673, 0.1976, −0.1607, 0.1154, 0.1543,
0.2299, 0.1871, −0.0944, −0.1580, −0.1377, 0.2005, 0.1306,
−0.1786, −0.2020, 0.1380, −0.1420, 0.1746, −0.2172,
−0.0718, −0.1071, −0.1348, 0.1179, −0.1356, −0.1260,
−0.1961, 0.1404, 0.0543, −0.1013, −0.0873, −0.1367,
−0.1274, −0.0939, 0.1588, 0.1355, 0.1139, 0.1101, −0.2122,
0.1204, 0.2133, 0.0758, 0.1671, 0.2256, 0.1759, −0.1646,
0.1071, −0.1889, 0.0911, 0.0969, −0.2067, 0.1602, −0.1832,
0.2167, −0.1034, 0.1961, 0.1419, −0.0799, −0.1856, 0.0427,
−0.2014, −0.1658, 0.1091, 0.1438, −0.1346, −0.1840,
0.1699, −0.1857, −0.1569, −0.1601, 0.1184, 0.0995, 0.1145,
−0.1929, 0.1440, 0.1740, 0.1530, −0.1427, −0.1521,
−0.1450, −0.1570, 0.1616, −0.1668, 0.0854, 0.1763,
−0.1976, 0.1595, −0.1828, −0.1610, −0.1855, −0.1705,
−0.1532, 0.1313, 0.1375, −0.1334, 0.1576, 0.0819, −0.1078,
−0.0996, −0.1633, −0.1199, −0.1523, −0.0986, 0.2245,
−0.1534, −0.1291, 0.1980, −0.1277, −0.2300, −0.1752,
−0.1504, −0.1704, −0.0479, −0.1788, 0.1300. The values in this vector should be multiplied by 0.0001 prior to use.

Correlation reference k is a vector given as follows:
0.1276, 0.1217, −0.1981, 0.1196, 0.1013, 0.0835, −0.1217,
−0.0496, 0.0902, −0.1333, −0.0511, 0.0982, −0.0791, 0.1367, 0.1454, −0.1180, 0.1110, 0.1328, 0.1303, −0.0800, 0.1255, 0.0875, −0.0721, −0.0893, 0.0769, 0.1041, −0.1606, 0.1092, −0.1392, 0.0871, −0.0893, 0.0888, 0.1033, 0.1442, 0.1015, 0.0935, 0.0825, −0.1182, −0.0937, −0.1496, −0.0676, −0.1260, 0.0589, −0.1248, −0.1398, −0.1649, −0.1187, 0.0533, 0.1082, −0.1341, −0.0803, −0.1087, 0.1228, −0.0693, 0.1551, −0.1237, −0.0604, 0.0636, 0.0906, 0.0777, 0.0836, −0.1118, 0.1223, −0.0866, −0.0996, −0.1928, −0.0848, −0.0864, −0.0805, 0.1173, 0.1067, −0.0643, 0.1209, 0.0819, −0.1217, 0.0572, −0.0937, −0.0825, 0.0836, −0.1086, −0.1499, −0.1345, 0.0635, −0.1161 −0.1047, 0.0602, 0.1142, −0.1079, −0.2043, 0.1583, −0.1697, 0.0721, −0.0917, 0.1398, −0.0872, −0.0924, −0.2031, −0.1116, −0.1651, −0.0728, 0.1032, 0.0979, 0.0629, 0.0344, 0.1111 −0.1624, 0.0515, 0.1608, 0.1839, 0.0869, 0.0285, −0.1036, 0.1240, 0.0751, 0.1159, −0.1330, 0.0483, −0.0975, 0.1146, 0.0663, −0.0598, −0.0799, −0.0869, −0.0616, 0.1066, −0.1140, 0.1227, 0.0896. The values in this vector should be multiplied by 0.0001 prior to use.

It should be understood, however, that these values may be varied without departing from the scope of the invention.

The least squares solution of equations (6)-(13) is preferably computed using the singular value decomposition (SVD) procedure since this procedure is stable numerically and provides either the unique solution or the minimum 2-norm least squares solution. The singular value decomposition procedure is a well known method used, for example, in the Matlab library of functions. The variance of the channel estimate is proportional to the 2-norm of the stored vectors, and use of the minimum 2-norm solution achieves minimum variance of the channel estimate for the correlation approach described herein.

Figure 6:
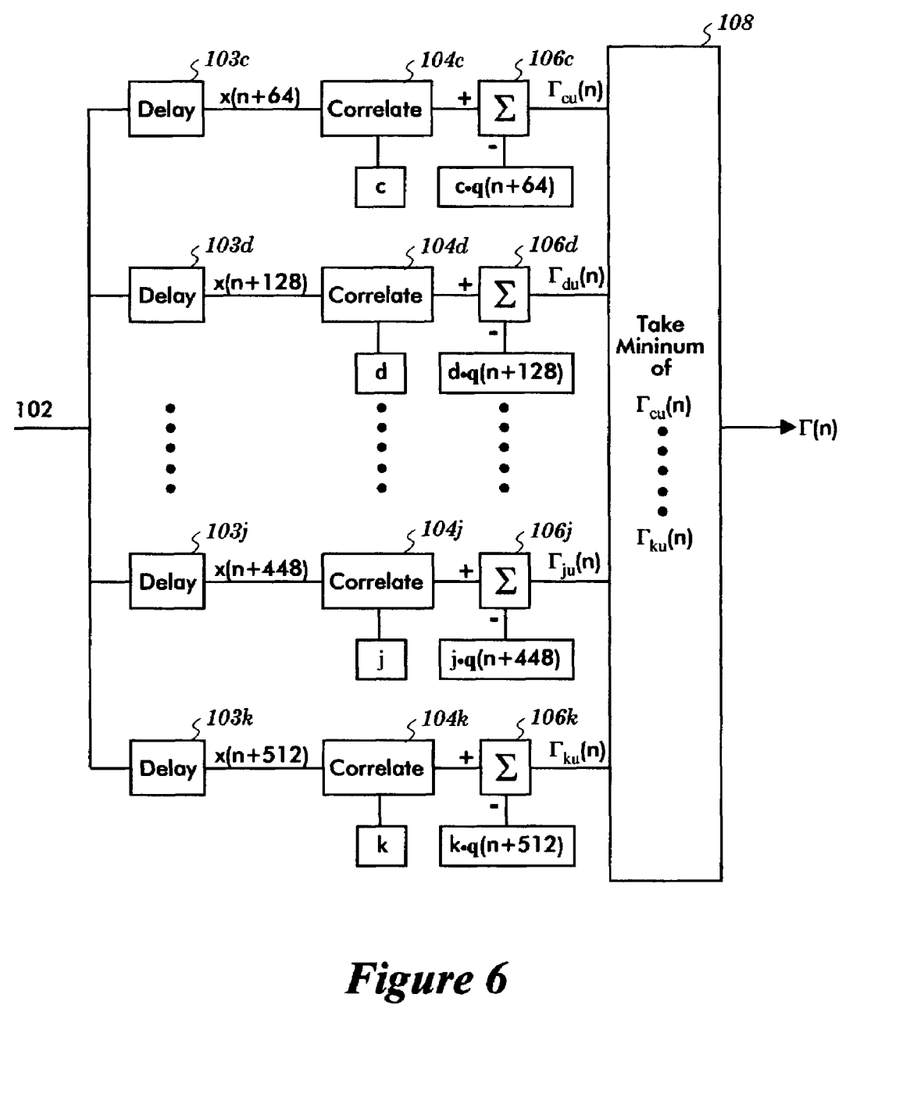
FIG. 6 illustrates a system for determining a channel impulse response in accordance with one embodiment of the present invention; and, FIG. 7 illustrates exemplary cleaned correlations produced by the system of FIG. 6.

A system 100 shown in FIG. 6 utilizes the correlation references c, d, e, f, g, h, j, and k in order to generate a correlation that is free of data related noise. The received signal on line 102 is applied to a delay 103$_c$, whose output is correlated by a correlator 104$_c$ with the correlation reference c, and the correlator 104$_c$ supplies the resulting correlation to a clean-up summer 106$_c$ that cleans the correlation result from the correlator 104$_c$ to produce a cleaned correlation $\Gamma_{cu}$ [n]. The cleaned correlation $\Gamma_{cu}$ [n] is supplied to a selector 108 whose operation is described below.

The received signal on line 102 is also delayed by a delay 103$_d$ whose output is correlated by a correlator 104$_d$ with the correlation reference d, and the correlator 104$_d$ supplies the resulting correlation to a clean-up summer 106$_d$ that cleans the correlation result from the correlator 104$_d$ to produce a cleaned correlation $\Gamma_{du}$ [n]. The cleaned correlation $\Gamma_{du}$ [n] is also supplied to the selector 108.

Similarly, the received signal on line 102 is delayed by delays 103$_e$-103$_k$ whose outputs are correlated by respective correlators 104$_e$, 104$_f$, 104$_g$, 104$_h$, 104$_j$, and 104$_k$ with the corresponding correlation references e, f, g, h, j, k, and summers 106$_e$, 106$_f$, 106$_g$, 106$_h$, 106$_j$, and 106$_k$ clean the corresponding correlation results to produce corresponding cleaned correlations $\Gamma_{eu}$ [n], $\Gamma_{fu}$ [n], $\Gamma_{gu}$ [n], $\Gamma_{hu}$ [n], $\Gamma_{ju}$ [n], and $\Gamma_{ku}$ [n]. Alternatively, a single delay with multiple taps can be used in place of the individual delays 103$_c$-104$_k$.

The summers 106$_c$-106$_k$ are used to compensate for the bias introduced by the least squares solution of the equations (6)-(13), (i.e., equations (6)-(13) are solved using a least squares solution because the equations are over determined in that matrix S is tall having more rows than columns). This compensation is achieved by correlating the vectors c, d, e, f, g, h, j, and k with a vector q(n) offset by a different amount for each correlation. The resulting correlations are subtracted from the respective outputs of the correlators 104$_c$-104$_k$.

A vector $\hat{q}$ comprising zeros in the place of data symbols may be given by the following equation:

$$\hat{q} = [0_{2500}^T \; t^T \; 0_{2500}^T]^T \tag{22}$$

where t is the training sequence of length 704. For practical purposes, $\hat{q}$ can be limited to $\hat{q}(n)$ having 128 entries of $\hat{q}$ beginning at the $n^{th}$ entry of $\hat{q}$ for n=1, 2, ..., 5576. Vector q(n) may then be defined in accordance with the following equation:

$$q(n) = \hat{q}(n) + \sum_{i=1}^{N} A(i)\hat{q}(n - \tau(i)) \tag{23}$$

where N is the number of multipath components in the channel, and where each multipath component has an attenuation A(i) and a delay $\tau(i)$.

Figure 7:
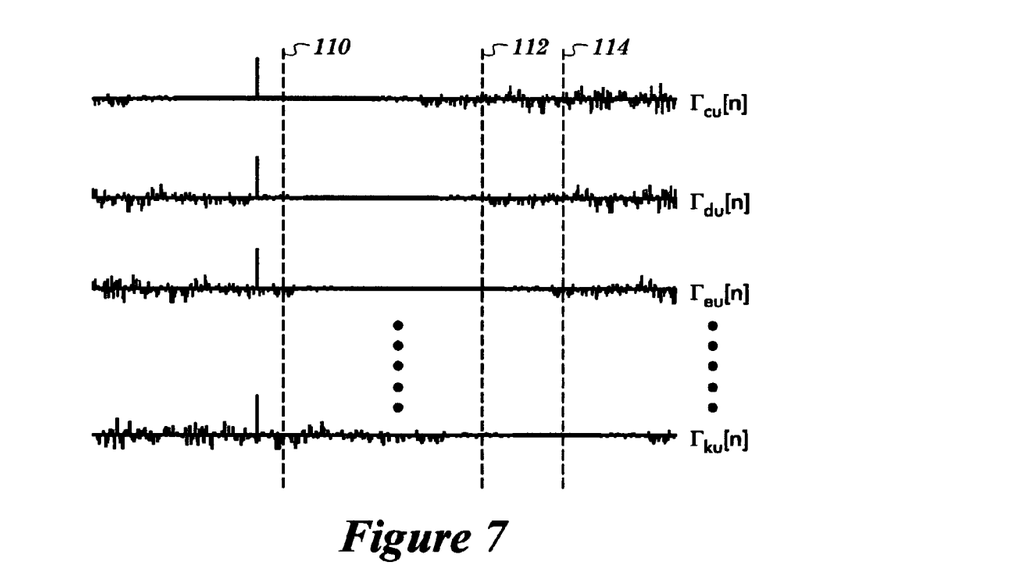

The cleaned correlations $\Gamma_{cu}$ [n], $\Gamma_{du}$ [n], $\Gamma_{eu}$ [n], $\Gamma_{fu}$ [n], $\Gamma_{gu}$ [n], $\Gamma_{hu}$ [n], $\Gamma_{ju}$ [n], and $\Gamma_{ku}$ [n], for example, may have the appearance shown in FIG. 7. For convenience multipath signal components are not shown in FIG. 7 for ease of understanding. The selector 108 forms a composite output correlation $\Gamma$[n] by selecting the minimum correlation value at each correlation index from the cleaned correlations $\Gamma_{cu}$ [n], $\Gamma_{du}$ [n], $\Gamma_{eu}$ [n], $\Gamma_{fu}$ [n], $\Gamma_{gu}$ [n], $\Gamma_{hu}$ [n], $\Gamma_{ju}$ [n], and $\Gamma_{ku}$ [n]. Three such indices 110, 112, and 114 are shown in FIG. 7 by the vertical dashed lines. Thus, the composite output correlation $\Gamma$[n] has a value of zero at the index 110 because the cleaned correlations $\Gamma_{cu}$ [n] has a value of zero at the index 110, the composite output correlation $\Gamma$[n] has a value of zero at the index 112 because the cleaned correlations $\Gamma_{eu}$ [n] has a value of zero at the index 112, and the composite output correlation $\Gamma$[n] has a value of zero at the index 114 because the cleaned correlations $\Gamma_{ku}$ [n] has a value of zero at the index 114.

The correlation peak due to the main signal is not eliminated by the selector 108 in this procedure because each of the cleaned correlations $\Gamma_{cu}$ [n], $\Gamma_{du}$ [n], $\Gamma_{eu}$ [n], $\Gamma_{fu}$ [n], $\Gamma_{gu}$ [n], $\Gamma_{hu}$ [n], $\Gamma_{ju}$ [n], and $\Gamma_{ku}$ [n] will have a main signal correlation peak at the same index. Similarly, any other peaks due to additional transmission paths of the main signal are not eliminated by the selector 108 in this procedure because each of the cleaned correlations $\Gamma_{cu}$ [n], $\Gamma_{du}$ [n], $\Gamma_{eu}$ [n], $\Gamma_{fu}$ [n], $\Gamma_{gu}$ [n], $\Gamma_{hu}$ [n], $\Gamma_{ju}$ [n], and $\Gamma_{ku}$ [n] will have additional correlation peaks at corresponding indices.

The composite output correlation $\Gamma$[n] may then be used such as in the manner described above to produce the tap weights for the taps of an equalizer.

Modifications of the present invention will occur to those practicing in the art of the present invention. For example, the present invention has been particularly described above in relation to the application involving digital television. However, the present invention may be used in other fixed location applications, as well as in movable location applications such as those related to cellular telephones. In these other applications, the lengths of the training signal and of the correlation reference(s) may be different than those disclosed herein.

Also, eight correlation references have been described above in the multiple correlation embodiment. Instead, other numbers of correlation references may be used.

Moreover, the entries in the vectors $\gamma_c$, $\gamma_d$, $\gamma_e$, $\gamma_f$, $\gamma_g$, $\gamma_h$, $\gamma_j$, and $\gamma_k$ shown in equations (14)-(21) are shifted by 64. Instead, the entries in these vectors $\gamma_c$, $\gamma_d$, $\gamma_e$, $\gamma_f$, $\gamma_g$, $\gamma_h$, $\gamma_j$, and $\gamma_k$ may shifted by a different number. For example, the entries in these vectors $\gamma_c$, $\gamma_d$, $\gamma_e$, $\gamma_f$, $\gamma_g$, $\gamma_h$, $\gamma_j$, and $\gamma_k$ may be shifted by a number larger than 64 in order to avoid overlaps.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method of estimating the channel impulse response of a channel comprising:
    performing a plurality of correlations, wherein each of the correlations provides a substantially noise-free estimate of the impulse response of a different portion of the channel; and,
    combining the plurality of substantially noise-free estimates to provide an estimate of the channel impulse response.

2. The method of claim 1 wherein each of the correlations comprises:
    correlating a received signal and a different stored vector to produce a correlation result; and,
    cleaning the correlation result to provide a respective one of the substantially noise-free estimates.

3. The method of claim 1 wherein each of the correlations comprises correlating a received signal and a different stored vector, wherein the received signal comprises a training sequence having a length $L_{tr}$, wherein each of the stored vectors has a length $L_{sv}$, wherein $L_{tr}/n=L_{sv}$, and wherein n is greater than two.

4. The method of claim 3 wherein n=11/2.

5. The method of claim 3 wherein $L_{tr}$=704 symbols, wherein $L_{sv}$=128 symbols, and wherein n=11/2.

6. The method of claim 1 wherein each of the correlations comprises correlating a received signal and a different stored vector, wherein the received signal comprises a training sequence, and wherein each of the stored vectors is determined from the training sequence and a correspondingly different ideal channel vector.

7. The method of claim 6 wherein each of the stored vectors is determined as a least squares solution of the following equations computed using a singular value decomposition:

$Sc=\gamma_c$ $Sd=\gamma_d$ $Se=\gamma_e$ $Sf=\gamma_f$ $Sg=\gamma_g$ $Sh=\gamma_h$ $Sj=\gamma_j$ $Sk=\gamma_k$ wherein S is a matrix presenting the training sequence, wherein c, d, e, f, g, h, j, and k are the stored vectors, and where $\gamma_c$, $\gamma_d$, $\gamma_e$, $\gamma_f$, $\gamma_g$, $\gamma_h$, $\gamma_j$, and $\gamma_k$ are the ideal channel vectors.

8. The method of claim 7 wherein each of the correspondingly different ideal channel vectors comprises a vector having all zeroes except for a one at a correspondingly different position.

9. The method of claim 6 wherein each of the correspondingly different ideal channel vectors comprises a vector having all zeroes except for a one at a correspondingly different position.

10. The method of claim 1 wherein the combining of the plurality of substantially noise-free estimates comprises combining the minimum values from the plurality of correlations by index to provide the estimate of the channel impulse response.

11. The method of claim 10 wherein each of the correlations comprises correlating a received signal and a different stored vector, wherein the received signal comprises a training sequence having a length $L_{tr}$, wherein each of the stored vectors has a length $L_{sv}$, wherein $L_{tr}/n=L_{sv}$, and wherein n is greater than two.

12. The method of claim 11 wherein n=11/2.

13. The method of claim 11 wherein $L_{tr}$=704 symbols, wherein $L_{sv}$=128 symbols, and wherein n=11/2.

14. The method of claim 10 wherein each of the correlations comprises correlating a received signal and a different stored vector, wherein the received signal comprises a training sequence, and wherein each of the stored vectors is determined from the training sequence and a correspondingly different ideal channel vector.

15. The method of claim 14 wherein each of the stored vectors is determined as a least squares solution of the following equations computed using a singular value decomposition:

$Sc=\gamma_c$ $Sd=\gamma_d$ $Se=\gamma_e$ $Sf=\gamma_f$ $Sg=\gamma_g$ $Sh=\gamma_h$ $Sj=\gamma_j$ $Sk=\gamma_k$ wherein S is a matrix presenting the training sequence, wherein c, d, e, f, g, h, j, and k are the stored vectors, and where $\gamma_c$, $\gamma_d$, $\gamma_e$, $\gamma_f$, $\gamma_g$, $\gamma_h$, $\gamma_j$, and $\gamma_k$ are the ideal channel vectors.

16. The method of claim 15 wherein each of the correspondingly different ideal channel vectors comprises a vector having all zeroes except for a one at a correspondingly different position.

17. The method of claim 14 wherein each of the correspondingly different ideal channel vectors comprises a vector having all zeroes except for a one at a correspondingly different position.

18. The method of claim 1 wherein each of the correlations comprises correlating a received signal and a different stored vector to produce a corresponding correlation result.

19. A method of estimating the impulse response of a channel comprising:

receiving a signal; and, correlating the received signal with a stored vector derived as the least squares solution of the equation $Sc=\gamma$, wherein the received signal comprises a training sequence having a length $L_{tr}$, wherein S is a matrix formed by the transmitted training sequence, wherein c is the stored vector having a length $L_{sv}$, wherein $L_{tr}/n=L_{sv}$, wherein n is greater than two, and wherein $\gamma$ represents at least a portion of an ideal channel.

20. The method of claim 19 wherein the least squares solution is computed using singular value decomposition.

21. The method of claim 19 wherein $n=11/2$.

22. The method of claim 19 wherein $L_{tr}=704$ symbols, wherein $L_{sv}=128$ symbols, and wherein $n=11/2$.

23. The method of claim 19 wherein $L_{sv}=128$.

24. The method of claim 19 wherein the ideal channel comprises a vector having all zeroes except for a one at a selected position.

25. The method of claim 19 wherein the correlating of the received signal with a stored vector comprises:

correlating the received signal with each of a plurality of different stored vectors, wherein each of the stored vectors has a length $L_{sv}$ and is determined as a least squares solution of the following equations using a singular value decomposition:

$$Sc=\gamma_c$$

$$Sd=\gamma_d$$

$$Se=\gamma_e$$

$$Sf=\gamma_f$$

$$Sg=\gamma_g$$

$$Sh=\gamma_h$$

$$Sj=\gamma_j$$

$$Sk=\gamma_k$$

wherein S is a matrix presenting the training sequence, wherein c, d, e, f, g, h, j, and k are the stored vectors, and where $\gamma_c$, $\gamma_d$, $\gamma_e$, $\gamma_f$, $\gamma_g$, $\gamma_h$, $\gamma_j$, and $\gamma_k$ are the ideal channel vectors; and, combining the correlation results.

26. A method comprising:

selecting a training sequence, wherein the training sequence is contained in a signal received by a device;

selecting an ideal channel, wherein the ideal channel comprises an idealized form of a channel through which the device receives the signal;

determining a vector from the training sequence and the ideal channel; and, storing the vector in the device.

27. The method of claim 26 wherein the training sequence has a length $L_{tr}$, wherein the vector has a length $L_{sv}$, wherein $L_{tr}/n=L_{sv}$, and wherein n is greater than two.

28. The method of claim 27 wherein $n=11/2$.

29. The method of claim 27 wherein $L_{tr}=704$ symbols, wherein $L_{sv}=128$ symbols, and wherein $n=11/2$.

30. The method of claim 27 wherein $L_{sv}=128$.

31. The method of claim 26 wherein the vector is determined by dividing the ideal channel by the training sequence.

32. The method of claim 31 wherein the ideal channel comprises a vector having all zeroes except for a one at a selected position.

33. The method of claim 26 wherein the ideal channel comprises a vector having all zeroes except for a one at a selected position.

34. The method of claim 26 wherein the determining of a vector from the training sequence and the ideal channel comprises determining a plurality of vectors different from the training sequence and the ideal channel, wherein the storing of the vector in the device comprises storing the plurality of vectors in the device.

* * * * *